United States Patent

Frey, Jr. et al.

[15] 3,648,237

[45] Mar. 7, 1972

[54] APPARATUS AND METHOD FOR OBTAINING SYNCHRONIZATION OF A MAXIMUM LENGTH PSEUDORANDOM SEQUENCE

[72] Inventors: Alexander H. Frey, Jr., Gaithersburg; Burton E. Schlosburg, Takoma Park; Ralph E. Tygielski, Derwood, all of Md.

[73] Assignee: International Business Machines, Corporation, Armonk, N.Y.

[22] Filed: Feb. 28, 1969

[21] Appl. No.: 803,225

[52] U.S. Cl. ......................340/146.1, 178/69.5, 179/15 AE, 179/15 BS

[51] Int. Cl. ..........................................................H04l 7/08

[58] Field of Search................340/146.1; 179/15; 178/69.5; 235/153

[56] References Cited

UNITED STATES PATENTS

| | | | |
|---|---|---|---|
| 3,394,224 | 7/1968 | Helm | 179/15 X |
| 3,463,911 | 8/1969 | Dupraz et al. | 340/146.1 X |
| 3,466,601 | 9/1969 | Tong | 340/146.1 |

*Primary Examiner*—Malcolm A. Morrison
*Assistant Examiner*—Charles E. Atkinson
*Attorney*—Hanifin and Jancin and Edward M. Suden

[57] ABSTRACT

An apparatus and method for obtaining synchronization of a maximum length pseudorandom sequence included within input data. The apparatus comprises means for generating a predicted pseudorandom sequence, means for comparing the pseudorandom sequence with the input data and means for determining from said comparison whether said predicted pseudorandom sequence and said input data are the same. The method employed is a bit-by-bit comparison between the predicted values of a predicted pseudorandom sequence and the incoming values of the input data, synchronization is indicated when a predetermined number of successive comparisons are obtained, where said predetermined number of successive comparisons is less in number than the maximum length of the specified maximum length pseudorandom sequence.

7 Claims, 5 Drawing Figures

PATENTED MAR 7 1972 3,648,237

SHEET 1 OF 3

FIG. I

INVENTORS
ALEXANDER H. FREY, JR
BURTON E. SCHLOSBURG
RALPH E. TYGIELSKI

BY [signature]

AGENT

| STEP | CONTENTS OF SHIFT REGISTER | | | | | OUTPUT ⊕ | DECIMAL VALUE OF S.R. | STEP | CONTENTS OF SHIFT REGISTER | | | | | OUTPUT ⊕ | DECIMAL VALUE OF S.R. |
|---|---|---|---|---|---|---|---|---|---|---|---|---|---|---|---|
| | $X_{n-1}$ | $X_{n-2}$ | $X_{n-3}$ | $X_{n-4}$ | $X_{n-5}$ | | | | $X_{n-1}$ | $X_{n-2}$ | $X_{n-3}$ | $X_{n-4}$ | $X_{n-5}$ | | |
| 1 | 0 | 0 | 0 | 0 | 0 | 1 | 0 | 17 | 1 | 1 | 1 | 0 | 1 | 1 | 29 |
| 2 | 1 | 0 | 0 | 0 | 0 | 1 | 16 | 18 | 1 | 1 | 1 | 1 | 0 | 0 | 30 |
| 3 | 1 | 1 | 0 | 0 | 0 | 1 | 24 | 19 | 0 | 1 | 1 | 1 | 1 | 1 | 15 |
| 4 | 1 | 1 | 1 | 0 | 0 | 0 | 28 | 20 | 1 | 0 | 1 | 1 | 1 | 1 | 23 |
| 5 | 0 | 1 | 1 | 1 | 0 | 0 | 14 | 21 | 1 | 1 | 0 | 1 | 1 | 0 | 27 |
| 6 | 0 | 0 | 1 | 1 | 1 | 1 | 7 | 22 | 0 | 1 | 1 | 0 | 1 | 1 | 13 |
| 7 | 1 | 0 | 0 | 1 | 1 | 0 | 19 | 23 | 1 | 0 | 1 | 1 | 0 | 0 | 22 |
| 8 | 0 | 1 | 0 | 0 | 1 | 0 | 9 | 24 | 0 | 1 | 0 | 1 | 1 | 0 | 11 |
| 9 | 0 | 0 | 1 | 0 | 0 | 0 | 4 | 25 | 0 | 0 | 1 | 0 | 1 | 1 | 5 |
| 10 | 0 | 0 | 0 | 1 | 0 | 1 | 2 | 26 | 1 | 0 | 0 | 1 | 0 | 1 | 18 |
| 11 | 1 | 0 | 0 | 0 | 1 | 0 | 17 | 27 | 1 | 1 | 0 | 0 | 1 | 0 | 25 |
| 12 | 0 | 1 | 0 | 0 | 0 | 1 | 8 | 28 | 0 | 1 | 1 | 0 | 0 | 0 | 12 |
| 13 | 1 | 0 | 1 | 0 | 0 | 0 | 20 | 29 | 0 | 0 | 1 | 1 | 0 | 0 | 6 |
| 14 | 0 | 1 | 0 | 1 | 0 | 1 | 10 | 30 | 0 | 0 | 0 | 1 | 1 | 0 | 3 |
| 15 | 1 | 0 | 1 | 0 | 1 | 1 | 21 | 31 | 0 | 0 | 0 | 0 | 1 | 0 | 1 |
| 16 | 1 | 1 | 0 | 1 | 0 | 1 | 26 | 1 | 0 | 0 | 0 | 0 | 0 | 1 | 0 |

1 1 1 0 0 1 0 0 0 1 0 1 0 1 1 1 1 0 1 1 0 1 0 0 1 1 0 0 0 0 0 — PSEUDO-RANDOM SEQUENCE 1 5 10 15 20 25 30

APPARATUS AND METHOD FOR OBTAINING SYNCHRONIZATION OF A MAXIMUM LENGTH PSEUDORANDOM SEQUENCE

CROSS REFERENCE

"Apparatus and Method for Rate Detection," inventors, N. Lazarchick, Jr.; A. H. Frey, Jr.; and E. N. Schroeder, Ser. No. 774,145 filed Nov. 7, 1968.

BACKGROUND OF THE INVENTION

The invention herein described was made in the course of and under a contract with the United States Air Force.

1. Field of the Invention

The invention relates to a method and apparatus for synchronizing the operation of the receiving and sending mechanisms. More particularly, the invention relates to a method and apparatus for obtaining synchronization from a transmitted maximum length pseudorandom sequence included within input data.

2. Prior Art

The use of maximum length pseudorandom sequences for the purpose of synchronization in the field of communications is widely known. The prior art approach has been to interrogate the total length of the pseudorandom sequence in order to determine if, in fact, synchronization has occurred. Where the maximum length of the pseudorandom sequence is very long, there is incurred an extensive cost as to hardware. The prior art solution to this problem has been to use a synchronization code made up of a maximum length pseudorandom sequence, that was short in duration, repeated a number of times. The inherent disadvantage of this approach, however, is that it is difficult to determine where in the sequence you are since each point in the sequence is repeated several times.

Another problem inherent in the use of maximum length pseudorandom sequences for the acquisition of synchronization is that it is susceptible to noise, both random and burst. The prior art method of identifying a random sequence is the use of a digital match filter which correlates the expected pseudorandom sequence with the actual received input data sequence and generating a correlation figure for the agreement between the two sequences. The common practice to overcome the problem of burst and random errors is to desensitize the threshold detector for recognizing a correlation factor of a value less than 1. This method of desensitizing the threshold detector takes into account only that errors have occurred and not the relationship between errors as to their placement within the maximum length pseudorandom sequence.

It is, therefore, the object of this invention to provide a new apparatus which will obtain synchronization from a maximum length pseudorandom sequence which takes into account not only the number of errors within the maximum length pseudorandom sequence, but also the relationship of the placement of the errors within the maximum length pseudorandom sequence.

Another object of the invention is to provide a new apparatus to provide synchronization from a maximum length pseudorandom sequence which does not utilize the entire length of the maximum length pseudorandom sequence and still provides a high probability of proper synchronization.

Another object of the invention is to provide a new method of obtaining synchronization from a maximum length pseudorandom sequence included within input data.

GENERAL DESCRIPTION

The invention relates to an apparatus which obtains synchronization from a specific maximum length pseudorandom sequence. The apparatus contains means for generating a predicted pseudorandom sequence from the input data sequence, means for comparing the generated predicted pseudorandom sequence with the input data sequence and means for indicating when synchronization is obtained. Once the input data sequence and predicted pseudorandom is deemed to be the same, the apparatus also contains means for identifying a particular point in the specific pseudorandom sequence.

The method involved within the invention is as follows; first, generating a predicted pseudorandom sequence from an input data sequence; second, comparing said generated predicted pseudorandom sequence with said input data sequence on a bit-by-bit serial basis; third, counting the number of successive agreements; fourth, determining when said count of agreements reaches a designated value that is indicative of the desired probability that the predicted pseudorandom sequence is the same as the input data sequence; and fifth, obtaining a point of reference for the specified maximum length pseudorandom sequence.

BRIEF DESCRIPTION OF THE DRAWINGS

The foregoing and other objects, features and advantages of the particular invention will be apparent from the following more particular description of the preferred embodiment of the invention, as illustrated in the accompanying drawings.

In the Drawings.

DETAILED DESCRIPTION OF THE INVENTION

The invention is related to a synchronization system for obtaining synchronization from a maximum length pseudorandom sequence included within input data. Two operations must be performed in order to obtain synchronization from a maximum length pseudorandom sequence: (1) Identification of the maximum length pseudorandom sequence as the specific maximum length pseudorandom sequence desired and, (2) the establishment of a point in reference within the identified maximum length pseudorandom sequence.

A basic teaching in the theory and use of pseudorandom sequences can be found in Golomb's, et al. book, *Digital Communications with Space Application*, Prentiss-Hall, EE Series, 1964.

Figure 1:
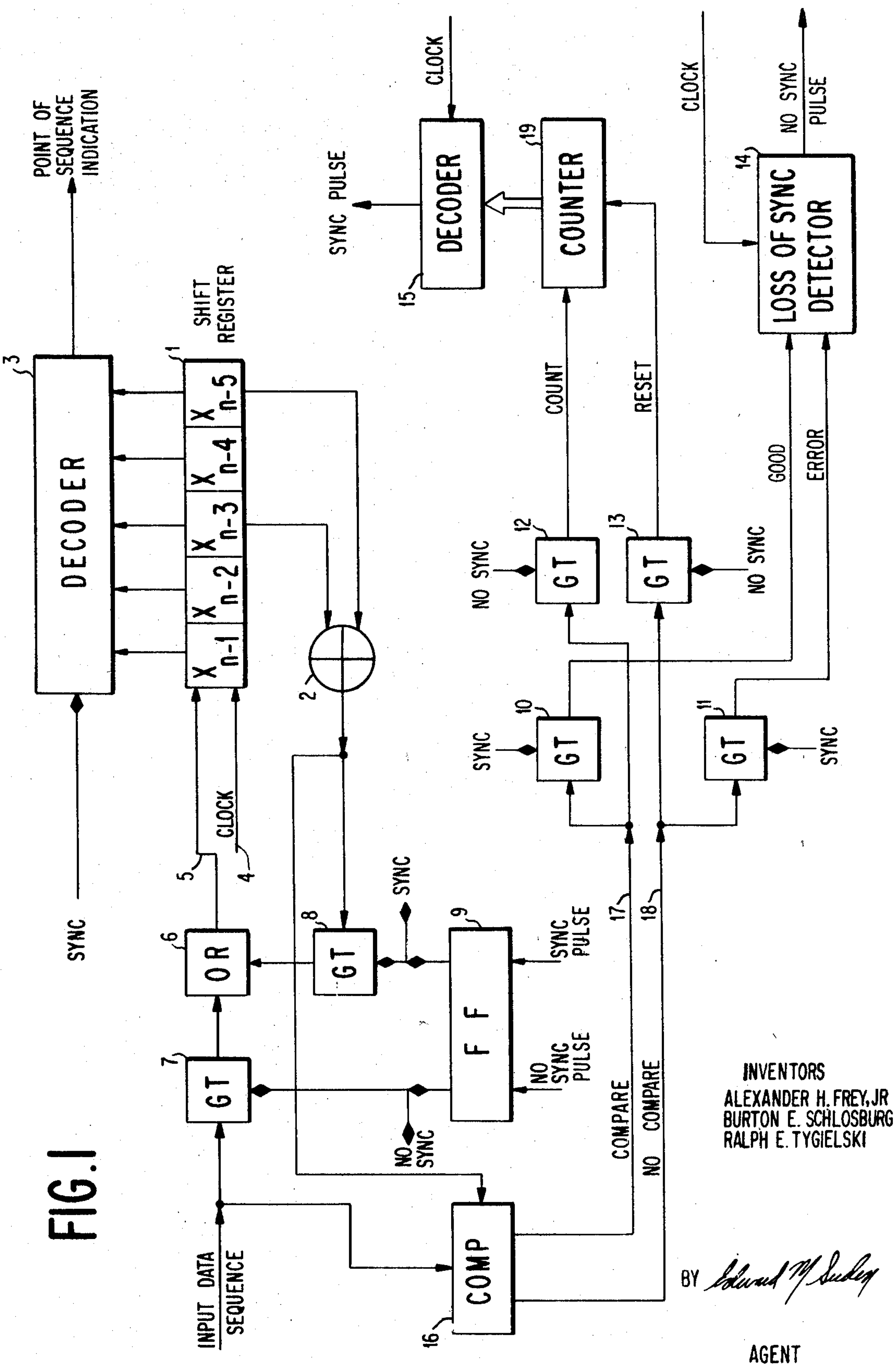
FIG. 1 shows an apparatus for obtaining synchronization of a maximum length pseudorandom sequence.

The preferred embodiment of the apparatus for obtaining synchronization from a specified maximum length pseudorandom sequence included within input data is shown in FIG. 1. It should be noted that for purposes of simplicity, the apparatus is shown for obtaining synchronization from a maximum length pseudorandom sequence which has a length of 31 binary bits. The maximum length of a pseudorandom sequence is defined by $2^n-1$, where $n$ is equal to the number of stages in the shift register. It can, therefore, be seen that in the apparatus shown in FIG. 1, $n$ is equal to 5 and therefore, the maximum length of the pseudorandom sequence generated will be 31 bits. It should be further noted that in order to have $n$ equal to some other value, all that has to be done is to change the length of the shift register and make the proper connections to the exclusive OR circuit in the manner described on page 25 of the Golomb reference.

FIG. 1 shows an apparatus for obtaining synchronization on a maximum length pseudorandom sequence of 31 binary bits. The apparatus is basically built around shift register 1. Shift register 1 has five stages, stages $X_{n-3}$ and $X_{n-5}$ are fed into an exclusive OR-circuit 2. The output of all five stages of shift register 1 are fed into decoder 3 which when conditioned by a SYNC state will recognize one of the 31 possible discrete sets of values that the shift register may contain. The decoder 3 provides an output reference signal whenever there is a SYNC state present and the contents of shift register 1 are of the preselected value. Shift register 1 is shifted by means of a clock input 4. The data input into shift register 1 is the output of OR circuit 6 which will allow the input 5 of shift register 1 to be controlled by either gate 7 or gate 8.

Flip-flop 9 controls the SYNC/NO-SYNC state indication. When flip-flop 9 is in a NO-SYNC state, then the data input 5 of shift register 1 is the input data sequence as gated by gate 7. When flip-flop 9 is in the SYNC state, the data input 5 of shift register 1 is the output of the exclusive OR-circuit 2 gated by gate 8. The SYNC state output of flip-flop 9 conditions the decoder 3 and gate circuits 10 and 11. The NO-SYNC state output of flip-flop 9 conditions gates 12 and 13. Flip-flop 9 is set to a NO-SYNC state by the output of the loss of sync detector 14. The SYNC state of flip-flop 9 is set by a sync input to flip-flop 9 from decoder 15.

The input data sequence is compared with the output of the exclusive OR-circuit 2 by means for comparator 16. Comparator 16 has a compare output line 17 and a no-compare output line 18. The compare line 17 strobes gates 10 and 12. The no-compare line 18 strobes gates 11 and 13. The output of gate 10 is fed as a good input into loss of sync detector 14. The output of gate 11 is fed as an error input to the loss of sync detector 14. The loss of sync detector also has a clock input. The output of loss of sync detector 14 is a no-sync pulse which will set a NO-SYNC state in flip-flop 9.

The output of gate 12 is connected as a step pulse to counter 19. The output of gate 13 is connected as a reset pulse to counter 19 and will reset counter 19 to all zeros whenever a pulse appears on the reset line. The output of counter 19 is fed into decoder 15. Decoder 15 will provide an output sync pulse whenever the counter 19 obtains a desired binary value. The sync output line of decoder 15 is connected to flip-flop 9 to set the Sync state of flip-flop 9.

Figures 2, 3, 4:
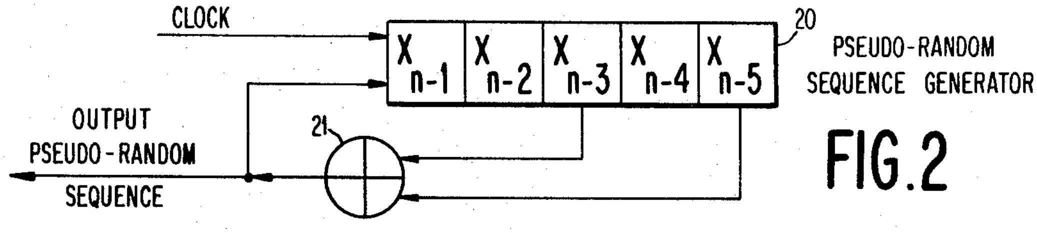
FIG. 2 shows a prior art pseudorandom sequence generator.
FIG. 3 shows the state of the pseudorandom sequence generator during each step necessary to generate a pseudorandom sequence by the pseudorandom generator in FIG. 2.
FIG. 4 shows the generated pseudorandom sequence generated by the pseudorandom generator in FIG. 2.

In order to understand the operation of the foregoing disclosed apparatus, it is necessary to understand how a maximum length pseudorandom sequence is generated. FIG. 2 shows a state of the art maximum length pseudorandom sequence generator. The maximum length pseudorandom sequence generator shown is constructed in accordance with the prior art as set forth in the Golomb reference. The maximum length pseudorandom sequence generator is simply comprised of shift register 20 and exclusive OR-circuit 21. The shift register 20 is shifted by some clocking means and the output of the maximum length pseudorandom sequence generator is taken as the output of the exclusive OR-circuit 21 which is also connected as a feedback input to shift register 20.

FIG. 3 shows a step-by-step analysis of how the output pseudorandom sequence is generated by the maximum length pseudorandom sequence generator as shown in FIG. 2. The contents of shift register 20 was assumed to be all zeros for step 1 and under these conditions the output of stages $X_{n-3}$ and $X_{n-5}$ were fed into the exclusive OR-circuit 21 which in turn provided an output of 1. The 1 output was fed back into stage $X_{n-1}$ of shift register 20 and outputted on the output line as a bit of the desired maximum length pseudorandom sequence. This process can be followed through the 31 steps and it can be seen that after the 31st step the contents of shift register 20 will again be all zeros. It is clear that the pseudorandom sequence will repeat after 31 bits. FIG. 3 also shows the decimal value of the contents of the shift register during each of the 31 steps necessary to generate the 31-bit maximum length pseudorandom sequence. The decimal values distinctly point out that there is a unique set of conditions within shift register 20 for each bit that is generated in the maximum length pseudorandom sequence. This is to say that if we consider step 2 to generate bit 2 of the maximum length pseudorandom sequence, then bit 2 of the maximum length pseudorandom sequence could be identified whenever shift register 20 had a decimal value of 16. FIG. 4 shows the resulting maximum length pseudorandom sequence as generated by the maximum length pseudorandom sequence generated in FIG. 2.

Figure 5:
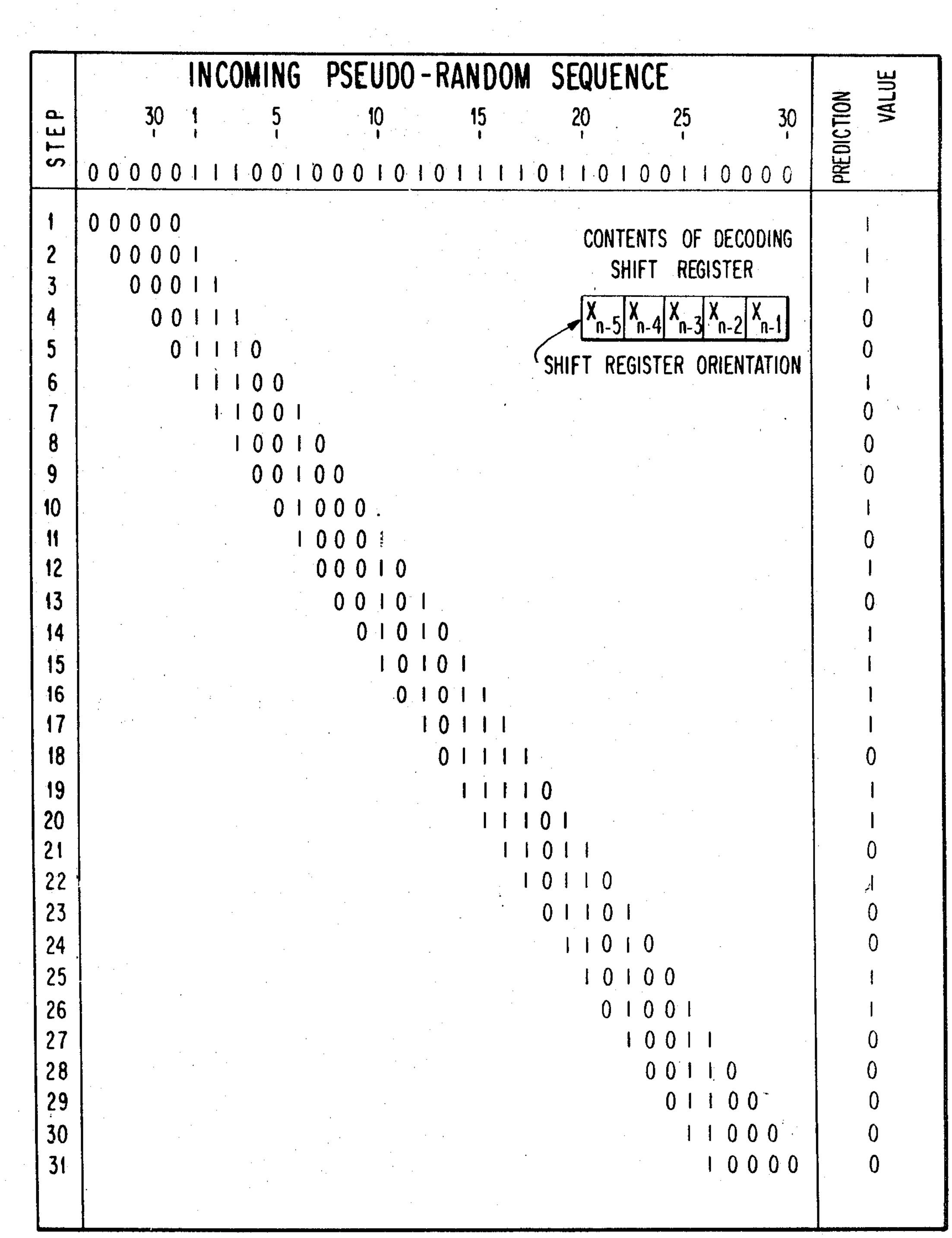
FIG. 5 shows the relationship between the generated predicted pseudorandom sequence and the content of the shift register in the FIG. 1 with the shift register in the pseudorandom sequence generator of FIG. 2 which generated the specific maximum length pseudorandom sequence.

A most important characteristic of a maximum length pseudorandom sequence is that each bit in the sequence is determined by the preceding *n* bits of the sequence. This is to say that in the maximum length random sequence having 31 bits, that is *n* is equal to 5, then each bit in the sequence is determined by the preceding 5 bits of the sequence. This is graphically pointed out by FIG. 5. FIG. 5 shows that if sequential overlapping groups of 5 bits are taken from the maximum length pseudorandom sequence, then the conditions of the maximum length pseudorandom generator as shown in FIG. 3 for all 31 steps are regenerated in the exact same sequence as they occurred during the generation of the maximum length pseudorandom sequence.

When synchronization is being sought the input data sequence is used to generate a predicted pseudorandom sequence. This is to say that each successive overlapping groups of 5 bits of the input data sequence are used to generate a predicted bit of a predicted pseudorandom sequence. The predicted bit of the predicted pseudorandom sequence is compared with the next successive bit of the input data sequence that follows the 5 bits of the input data sequence that were in shift register 1 to generate the predicted bit of the predicted pseudorandom sequence. Thus, we have a method whereby the input data sequence is used to generate a predicted pseudorandom sequence which is compared with the input data sequence that is generating it. The predicted pseudorandom sequence will be the same as the input data sequence when the input data sequence is the specified maximum length pseudorandom sequence.

The result is obtained by using a combination of a shift register and exclusive OR circuit which is exactly the same as the maximum length pseudorandom generator that would be used to generate the specific maximum length pseudorandom sequence. This can be seen by comparing shift register 1 and exclusive OR-circuit 2 in FIG. 1 with shift register 20 and exclusive OR-circuit 21 of FIG. 2.

FIG. 5 also shows what the output of the exclusive OR-circuit 2 will be under any of the 31 possible sets of values that may exist in shift register 1. It should be realized that the contents of the shift register 1 give rise to a prediction bit, this is to say that it produces a bit whose value should be equal to the next data bit arriving in input data sequence if, in fact, the input data sequence is the specific maximum length pseudorandom sequence that is being sought. By comparing the input data sequence with the predicted value in FIG. 5, it is clear that a maximum length pseudorandom sequence can be used to predict its own sequence of values.

When flip-flop 9 is in a NO-SYNC condition, synchronization is being sought and the input data sequence is gated by gate 7 through OR-circuit 6 on input line 5 to shift register 1. Therefore, the contents of shift register 1 will be interrogated by exclusive OR-circuit 2 which will in turn generate a predicted bit. The output of exclusive OR-circuit 2 is the predicted pseudorandom sequence. As each predicted bit is generated by exclusive OR-circuit 2, it is compared with the next bit of the input data sequence to determine if the predicted value and the actual value are in agreement. If there is agreement, then a compare signal is generated on line 17 which steps counter 19 one count via gate 12. However, if there is no agreement, then a no-compare is generated on line 18 which resets counter 19 to zero via gate 13. Decoder 15 is set for the number of successive agreements that is necessary to establish the desired probability that the predicted pseudorandom sequence is in fact the same as the input data sequence. Decoder 15 recognizes when the desired count is found in counter 19 and generates a sync pulse under this condition. The sync pulse in turn sets the sync state of flip-flop 9. When flip-flop 9 is set into a SYNC state, the input to shift register 1 is switched from the input data sequence to the predicted pseudorandom sequence generated by exclusive OR-circuit 2.

Once synchronization has been obtained, shift register 1 and exclusive OR-circuit 2 are connected by means of gate 8 and OR-circuit 6 to form a circuit that is identical to the maximum length pseudorandom sequence generator as shown in FIG. 2. The contents of shift register 1 will be continually monitored until decoder 3 recognizes one of the 31 distinct bit patterns present in shift register 1, thus obtaining the desired point of reference within the maximum length pseudorandom sequence. It is normal to pick one of the 31 bits of the maximum length pseudorandom sequence as being a last bit and, therefore, the contents of the shift register that is associated with that last bit would indicate the end of the maximum length pseudorandom sequence. In our example, this would be step 31 at which time the contents of shift register 2 would be 00001. The decoder 3 would sense the presence of bit pattern 00001 plus a SYNC indication from flip-flop 9 and cause a pulse to be generated which indicated that the input data sequence was the specific maximum length pseudorandom sequence and that the end of said specific maximum length pseudorandom sequence has been found.

Once synchronization has been obtained it is always desired to check to see if synchronization has been lost during succeeding sync periods; therefore, the output of exclusive OR circuit 2 is continued to be compared against the input data sequence by comparator 16. Under the SYNC state, when the predicted value and the actual value are the same, a compare pulse is generated on line 17 and gated by gate 10 as a good input to the loss of sync detector 14. In similar manner, if the predicted value and the actual value of the next pulse is not in agreement, a no-compare will be generated on line 18 and gated by gate 11 as an error input to the loss of sync detector 14. The loss of sync detector 14 may take on many forms. It may be a count-up/count-down counter which steps up for each error input and steps down for each good input. If the error count ever reaches a designated value, then loss of sync will be recognized and a no-sync pulse will be generated. Another form of loss of sync detector is the apparatus for rate detection that is disclosed in patent application entitled "Apparatus and Method for Rate Detection," Ser. No. 774,145, inventors, N. Lazarchick, Jr.; A. H. Frey, and E. N. Schroeder.

It has been stated that the decoder 15 recognizes the count in counter 19 that represents the desired probability that the incoming data sequence is the same as the predicted pseudorandom sequence. Of course, synchronization would be assured if we set decoder 15 to recognize a count of 31, which in turn would signify that there was complete agreement between the input data sequence and the predicted pseudorandom sequence. But, in order to obtain a high degree of probability that synchronization has been obtained, it is not necessary to have this complete agreement between every incoming bit of the input data sequence and the predicted pseudorandom sequence.

In the cases where the maximum length pseudorandom sequence becomes very long, for example, where *n* is equal to 8, the maximum length sequence is 255 bits long, it can be shown that the probability that the maximum length pseudorandom sequence is the one sought is equal to $1-2^{-(n+x)}$, where *n* is equal to the number of stages in the shift register and *x* is equal to the number of successive agreements. Thus, if we allow *n* to equal 8 and arbitrarily say that we need 22 successive agreements to indicate identification, then the probabilitv that we are in fact in sync is equal to $1-2^{-30}$, which is equal to 99.99999999 percent or approximately 1 change in 1 billion that the maximum length pseudorandom sequence is not the specific maximum length pseudorandom sequence sought. The implications of this are of tremendous advantage, since it is only necessary to have any 30 consecutive bits within the 255-bit maximum length pseudorandom sequence error free in order to determine that the specific maximum length pseudorandom sequence is present. Therefore, this method of synchronization is most advantageous where noise, random and/or burst, is present. Another immediate advantage is that in a maximum length pseudorandom sequence of *y* bits, there exists $(y-n-x+1)$ chances of obtaining identification during the pursuance of maximum length pseudorandom sequence. Therefore, in our example of a maximum length pseudorandom sequence of 255 bits with the criteria of 30 bits $(n+x)$ to be error free there would exist 226 chances within the one maximum length pseudorandom sequence of 255 bits of obtaining identification. It should further be noted that once identification has been obtained from any 30 bits, the selected point of reference is determined by the predicted pseudorandom sequence, and not by the input data sequence, such that there is no probability of missing the desired reference point due to errors in the input data sequence.

This is of particular use where there is a communication system which employs a sync frame, a communication system which periodically transmits synchronization information to synchronize the receiving station with the transmitting station. It would be most desirable under these conditions to establish synchronization as fast as possible regardless of errors in the incoming data. The method herein described and the apparatus embodied therein will provide a highly reliable, highly probable method and apparatus of obtaining synchronization quickly whether employing a minimum amount of error free data.

What is claimed is:

1. An apparatus for obtaining synchronization from input data by identifying a specific maximum length pseudorandom sequence included within said input data, and by obtaining a point of reference within said specified maximum length pseudorandom sequence, said specific maximum length pseudorandom sequence having a length *z* where $z=2^{n}-1$, $n=0, 1, 2 \ldots$ comprising:
   - a prediction sequence generator for generating a predicted pseudorandom sequence as a function of said input data;
   - a comparator for comparing said predicted pseudorandom sequence with said input data on a bit-by-bit serial basis, said comparator generating a compare output when the two bits being compared are the same and a no-compare output when the two bits being compared are not the same;
   - a first control means for determining a SYNC/NO-SYNC condition;
   - a first detecting means connected to said comparator for detecting the occurrence of *y* successive compare outputs from said comparator thereby signifying that the input data is the specific maximum length pseudorandom sequence, said first detecting means generating a sync output upon the occurrence of said *y* successive compare outputs from said comparator, said first control means generating a SYNC condition upon the occurrence of said sync output;
   - a second detecting means connected to said prediction sequence generator for detecting a selected bit pattern in said prediction sequence generator after said first control means has generated said SYNC condition, said second detecting means generating a reference output which establishes the desired reference point for said specific maximum length pseudorandom sequence;
   - a third detecting means connected to said comparator for detecting a loss of synchronization after said first control means has generated said SYNC condition, said third detecting means generating a no-sync output which indicates a loss of sync, said first control means generating a NO-SYNC condition upon the occurrence of said no-sync output;
   - a second control means connected to said first control means for connecting said input data as the input to said prediction sequence generator under a NO-SYNC condition of said first control means, said second control means connecting the predicted sequence of said prediction sequence generator as an input from said prediction sequence generator under a SYNC condition of said first control means.

2. An apparatus as set forth in claim 1 wherein said prediction sequence generator comprises:

an $n$ stage shift register, each of said $n$ stages of said shift register having an output, the input to said shift register being the input of said prediction sequence generator;

an exclusive OR circuit connected to selected stages of said shift register such that the output of said exclusive OR circuit will be the specific maximum length pseudorandom sequence to be identified when said specific maximum length pseudorandom sequence is inputted as input data to said shift register, the output of said exclusive OR circuit being the output of said prediction sequence generator.

3. An apparatus as set forth in claim 1 wherein said third detecting means further comprises a first means for conditioning said third detecting means to operate only after said second detecting means has generated said reference output.

4. A method of obtaining synchronization from input data which includes a specific maximum length pseudorandom sequence, said specific maximum length sequence being $y$ bits long where $y=2^n-1$, comprising the steps of:

identifying said specific maximum length sequence in said input data by;

generating a prediction pseudorandom sequence from said input data;

comparing said prediction pseudorandom sequence with said input data on a bit-by-bit serial basis, generating a compare or no-compare signal for each said comparison, detecting when $x$ successive compare signals occur, when $x$ is less than $y$, generating a sync signal when $x$ successive compares have been detected which indicate that said specific maximum length pseudorandom sequence has been identified;

establishing a point of reference in said specific maximum length pseudorandom sequence by:

detecting in said prediction pseudorandom sequence a given bit pattern, generating a reference signal when said given bit pattern in said prediction pseudorandom sequence is detected which indicates that a point of reference in said specific maximum length pseudorandom sequence has been detected.

5. A method as set forth in claim 4 wherein the step of generating a prediction pseudorandom sequence comprises the steps of:

storing successive overlapping groups of $n$ bits of said input data, generating a prediction bit for each said successive overlapping group of $n$ bits in accordance with the same criterion that was used to generate said specific maximum length pseudorandom sequence, outputting successively said prediction bits to form said prediction pseudorandom sequence.

6. A method as set forth in claim 5 wherein the step of comparing comprises the step of:

comparing the $n+1$ bit of said input data with the prediction bit that was generated from the preceding $n$ bits of said input data.

7. A method of synchronization as set forth in claim 4 further comprising the step of:

determining loss of synchronization by, comparing said prediction pseudorandom sequence with said input data on a bit-by-bit serial basis, generating a compare or no-compare signal for each comparison, comparing the relative occurrences of said compare and no compare signal with a predetermined value to obtain an indication of loss of synchronization.

* * * * *